Nov. 8, 1966  R. C. NOLL ETAL  3,284,270
RECORD CARD MACHINE

Filed May 6, 1963  5 Sheets-Sheet 3

United States Patent Office 3,284,270
Patented Nov. 8, 1966

3,284,270
RECORD CARD MACHINE
Robert C. Noll and Joseph C. Seigh, Endicott, N.Y., assignors to International Business Machines Corporation, New York, N.Y., a corporation of New York
Filed May 6, 1963, Ser. No. 278,127
13 Claims. (Cl. 156—514)

This invention relates to apparatus for producing record cards, each having a frame of microfilm secured over an aperture in the card, whereby each card may contain a picture record of the data recorded or to be recorded.

In a commercial embodiment of the invention, the film frames are secured to apertured cards of the record type commonly employed in known and existing statistical card tabulating and sorting systems and machines, whereby the films or other inserts mounted in said cards may be conveniently classified and sorted mechanically as to subject matter in a manner understood in the art, as well as viewed, examined, indexed, and filed. Various means and methods have been employed in the art to produce film record cards of this type wherein segregated machines are required to produce a complete film record card. For example, there are film mounting machines which only mount film pieces to cards which have already been apertured on other machines, and there are die machines which only cut apertures in the cards and mount thereto film pieces which have been prepared on other machines. The primary reason for such segregated operations is to allow the manufacturer to produce an unfinished film record card which the customer can complete as desired. However, it has been found desirable and economically advantageous to provide a single machine which not only can be used to complete unfinished film record cards, but which also can automatically and accurately produce the apertured cards and cut film pieces and secure the film pieces to the apertured cards to produce completely assembled film record cards in one sequence of organized operations.

In providing such a machine, the present invention embodies a main vacuum drum to which conventional unapertured record cards are automatically fed in succession. The vacuum drum conveys the cards past grinding devices which make a depression in one surface of each card. The cards are then conveyed past a scoring station which scores and removes the portion of each card within the depressed area to provide each card with a shouldered aperture. The cards having shouldered apertures are then conveyed by the drum past a film applying station. The film applying station comprises means for receiving a strip of roll film, means for severing the film strip into individual pieces, means for applying a border of adhesive around each film piece, and means for seating each adhesive coated film piece into the shouldered aperture of a record card as it feeds past the station. The completed film record cards are then conveyed by the drum to suitable stacking means. A unique film transfer vacuum drum is provided at the film applying station having improved means for progressively gripping successive film pieces presented thereto and for positively holding the film pieces while they are being conveyed past the adhesive applying means and until they are secured to the record cards. The arrangement of the machine with the various mechanisms disposed about a periphery of a central card drum results in a compact and efficient machine which can convert conventional record cards to film record cards with greater speed than heretofore obtained.

Accordingly, an object of the present invention is to provide a novel and improved machine for automatically, rapidly and efficiently performing operations on successive cards to produce film record cards.

A further object of the present invention is to provide a novel and improved machine for automatically and efficiently performing operations on successive unapertured cards to produce completely assembled record cards which are ready for use.

Another object of the present invention is to provide a single machine having a plurality of mechanisms for automatically, rapidly and efficiently performing operations on successive unapertured cards and on a strip of roll film to produce film record cards, each of which contains an aperture and a film piece secured over the aperture.

Another object of the present invention is to provide a novel method of and mechanisms for automatically forming a depression on one surface of successive cards and removing the portion of each card within the depressed area to provide each card with a shouldered aperture.

A still further object of the present invention is to provide a novel method of and mechanisms for severing a strip of roll film into individual pieces, applying a border of adhesive around each film piece, and seating the adhesive coated film pieces into the shouldered apertures of successive record cards.

A further object of the present invention is to provide a novel and improved film transfer mechanism for receiving film pieces, conveying the film pieces past adhesive applying means, and seating the adhesive coated film pieces to the shouldered apertures in successive record cards.

Another object of the present invention is to provide a film transfer mechanism having novel and improved vacuum means for progressively gripping and positively holding successive film pieces presented thereto.

A further object of the present invention is to provide a novel and improved mechanism for applying an adhesive border to successive film pieces.

The foregoing and other objects, features and advantages of the invention will be apparent from the following more particular description of a preferred embodiment of the invention, as illustrated in the accompanying drawings.

Figure 1:
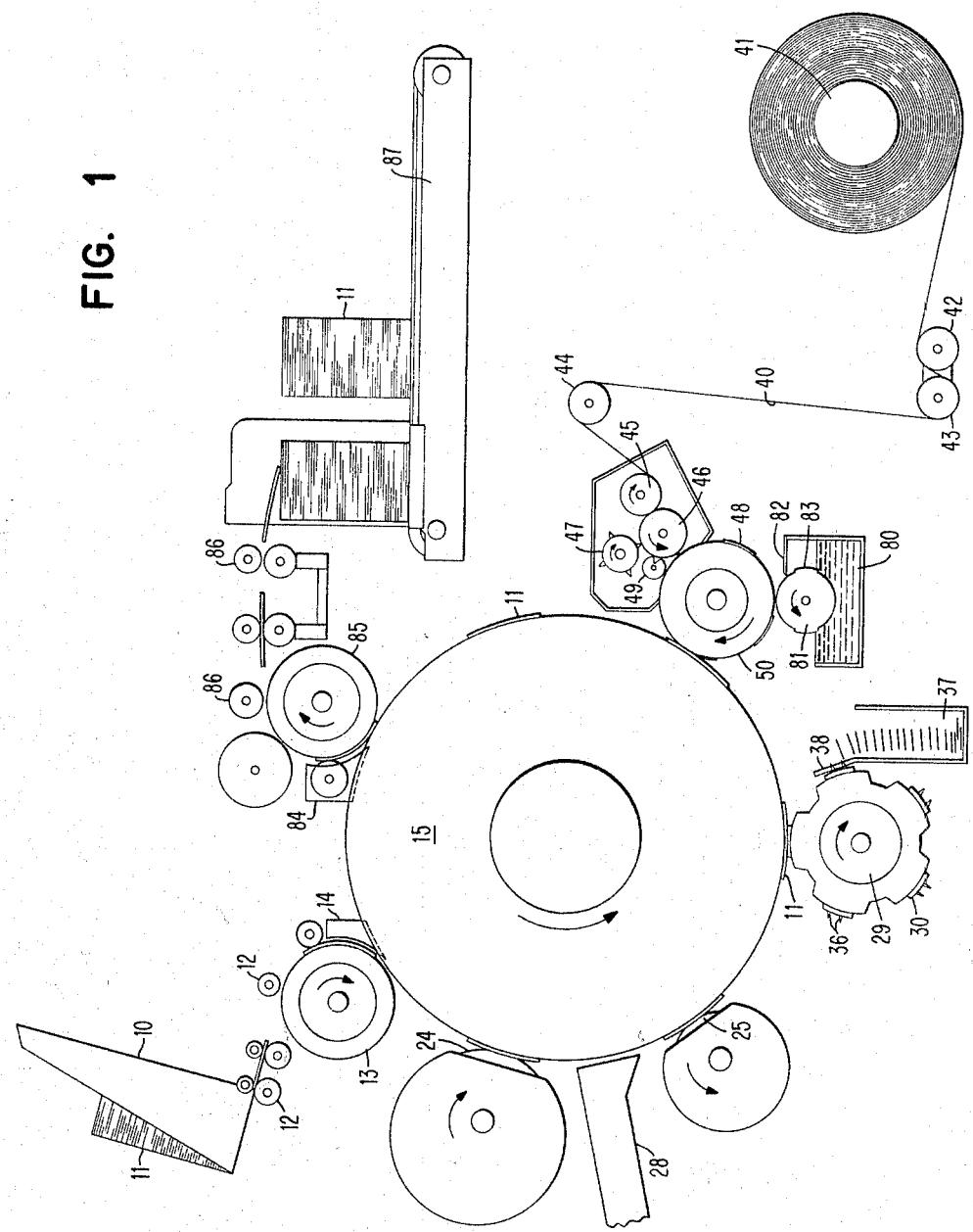
FIG. 1 is a diagrammatic view showing the general arrangement of a film record card producing machine constructed in accordance with and embodying the principles of the present invention.
Figure 2:
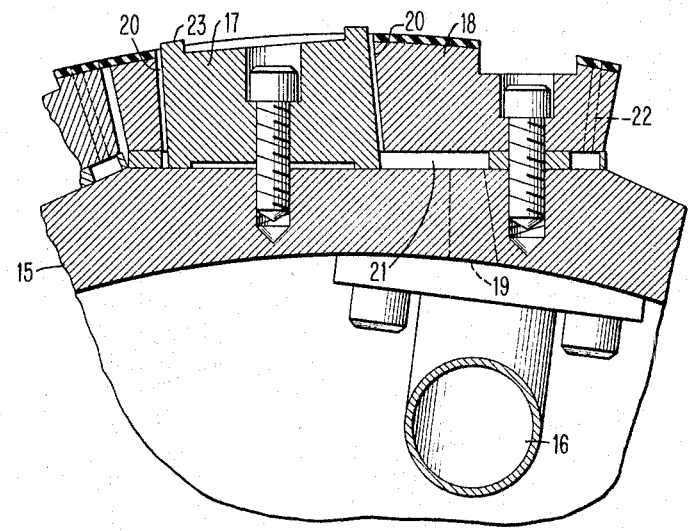
FIG. 2 is a partial sectional view of the card drum showing one of the steel inserts which coact with the grinding wheels to form a depressed area on the cards.
Figure 3:
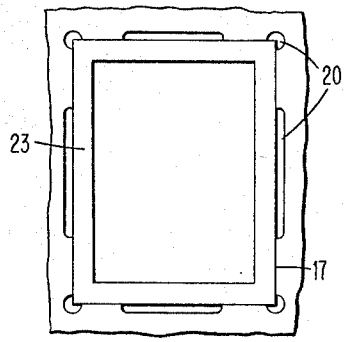
FIG. 3 is a plan view of one of the steel inserts disposed about the periphery of the vacuum drum.
Figure 9:
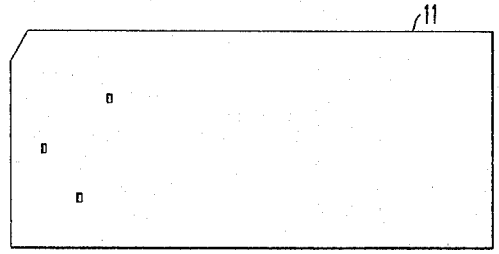
FIGS. 9–13 show a record card in various stages of completion as it is processed through the machine.

Referring to FIG. 1, the machine comprises a card hopper 10 for holding a stack of record cards 11 which are to be processed through the machine. As shown in FIG. 9, the cards 11 are preferably of the statistical record card type which generally have printed and/or punched information recorded thereon. The cards are automatically fed in succession out of the hopper by suitable picker knife means (not shown) and are conveyed by continuously driven feed rolls 12 between a card transfer roll 13 and card guide 14 and onto a central card conveying vacuum drum 15. As shown in FIGS. 2 and 3, the drum 15 includes a hollow portion having a suitable connection 16 to a source of vacuum (not shown). Fastened to the rim of the drum to form the peripheral surface thereof are a plurality of steel die inserts 17 surrounded by rubber faced inserts 18. Vacuum ports 19 are provided in the rim which communicate between the vacuum source and hollow channel areas 20 disposed between adjoining inserts for exposing the cards to vacuum. Vacuum is also distributed through channel areas 21 to ports 22 in the rubber faced inserts. The drum is continuously gear driven in a counterclockwise direction to convey the cards through the various operating stations of the machine at the same rate as cards are received from the hopper 10 and the arrangement of the inserts on the drum is such that each card will be placed and retained on the drum with the area of the card which is to be ground and scored positioned over a steel die insert 17 with the remainder of the card supported by the rubber faced inserts 18.

The steel die inserts each have a raised area 23 having the configuration of a rectangular frame or border to conform to the configuration of the shoulder depression to be ground on the cards. The vacuum channels 20 substantially surround the die to insure that the corresponding area of the card will be positively gripped during the grinding, scoring and film insertion operations.

Figure 10:
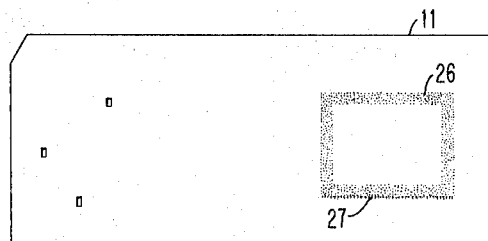
Figure 11:
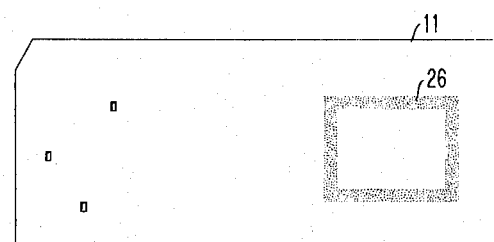

After the cards are positioned on the drum, they are conveyed first past a grinding station (FIG. 1) which comprises the successive grinding wheels 24 and 25. The first grinding wheel 24 is driven in a clockwise direction and is used to form the rectangular shoulder depression in each card, as indicated at 26 of the card shown in FIG. 10. This operation may leave burrs, such as indicated at 27, along the edge of the depression and consequently the depression is given a light touch by the second grinding wheel 25, which is driven in a counterclockwise direction, to remove any burrs so that the ground depression will have clean edges, as shown on the card in FIG. 11. Although not shown, it will be understood that well-known means may be employed for radially adjusting the grinding wheels to control the depth of grinding. The statistical cards 11 generally have a thickness in the order of .007 of an inch in which case the shoulder is preferably ground to a depth of .003 to .0035 of an inch. A suitable vacuum nozzle 28 is provided for dust removal purposes.

Figure 4:
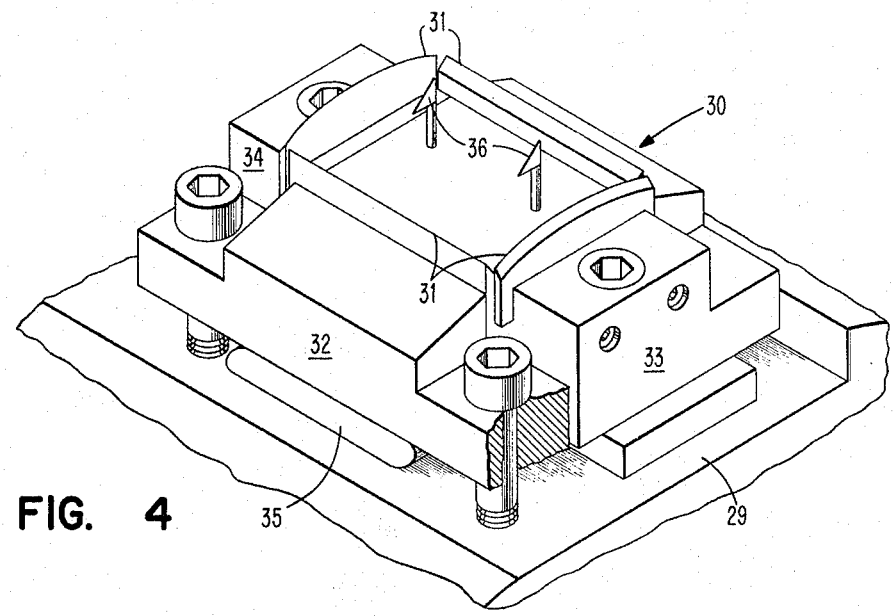
FIG. 4 is an isometric view showing the mechanism for scoring and removing a portion of the cards to form an aperture therein.
Figure 12:
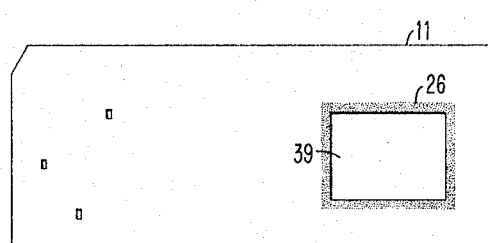

The cards are next conveyed to a scoring and chip removal station comprising a scoring drum 29 which is continuously driven in a clockwise direction. Disposed around the periphery of drum 29 are a plurality of individual scoring units 30 for scoring successive cards. Referring to FIG. 4, each scoring unit consists of four scoring blades or knives 31 arranged in rectangular fashion which coact with the steel die inserts 17 to score that portion of the card bordered by the ground rectangular depression 26. The knives are mounted on independent support blocks 32, 33 and 34 which in turn are backed up by a suitable substance or mechanism 35 having much less stiffness than the drum or roll 29 on which the units are mounted. With this construction, the cutting forces are equally divided between the knives and a more accurate and reliable score is obtained. Fixed on each support block 32 are a pair of hook-shaped piercing elements 36 which engage the chip as it is being scored and which function to remove the scored chip from each card as the cards feed out of the scoring station. A chip container 37 is provided which includes a stripper plate 38 for removing the chips from the piercing elements. FIG. 12 shows a card after the window area 39 within the ground depression has been scored and removed by roll 29.

The apertured cards are conveyed from the scoring station to a film applying station (FIG. 1) where a strip of roll film is cut into individual film pieces which are provided with an adhesive border and secured to the ground shoulders in the cards. A strip of film 40 is fed from a supply roll 41 through tension rollers 42, 43 and 44 and around a pair of steel metering rolls 45, 46 which form a part of the film cut-off mechanism. At this point, the film strip is traveling slower than the rate of card feed and the rotary cutting roll 47 coacts with metering roll 46 to sever the film strip into individual film pieces 48 which will fit onto the ground shoulder 26 in the cards.

As each film piece is severed, the control of its feed is taken over by a notched roll 49 until the film is gripped by a film transfer vacuum drum 50. The circumference of the notched roll 49 is equal to the length of each film piece and the notch is disposed such that as the leading edge of the film piece is gripped by the transfer drum, the notch in the roll will be over the trailing edge of the film piece to release the film. Hence, accurate control of the film pieces is maintained until they are positively gripped by the transfer drum.

Figure 5:
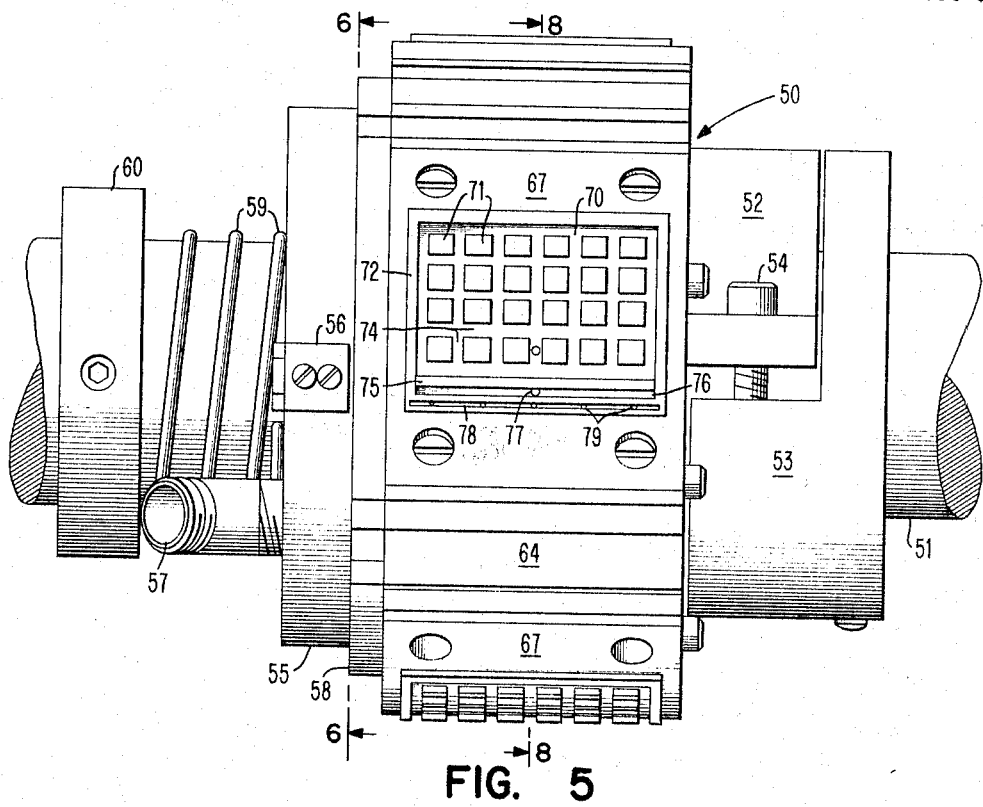
FIG. 5 is a view showing the general arrangement of the film transfer drum.
Figure 6:
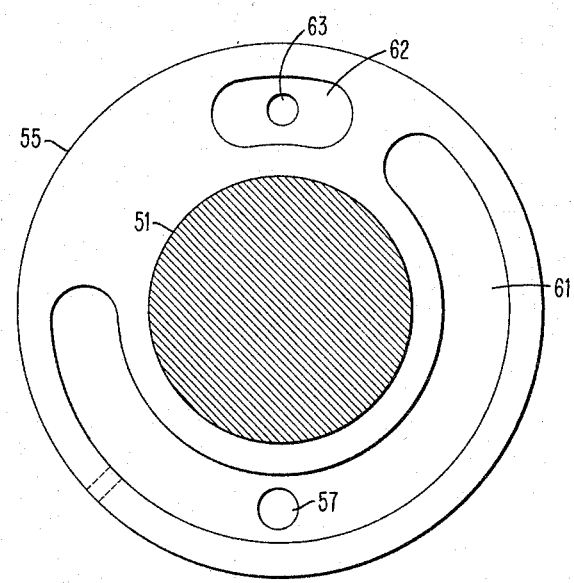
FIG. 6 is a view taken on line 6—6 of FIG. 5 showing the vacuum control plate for the film transfer drum.

Referring to FIG. 5, the transfer drum 50 is fixed on a gear driven shaft 51 by means of a semicircular flange portion 52 of the drum being bolted at each end to a collar member 53 which is pinned to the shaft. By tightening one and loosening the other of the bolts 54, the film drum may be given an angular adjustment on the shaft. On the other side of the drum, a vacuum control plate 55, loose on the shaft, is mounted in a pair of brackets 56 for axial movement along the shaft but not rotary movement. Control plate 55 has a suitable connection 57 to a vacuum source (not shown) and is pressed against a side plate 58 of the drum by means of a spring 59 and a collar 60 fixed on the shaft. The control plate is preferably made of a plastic material or the like to effectively seal the vacuum. As shown in FIG. 6, the control plate has a large vacuum port 61 which communicates between the vacuum connection 57 and the interior of the film drum and a smaller port 62 which communicates between a port 63 to the atmosphere and the interior of the film drum.

Figure 8:
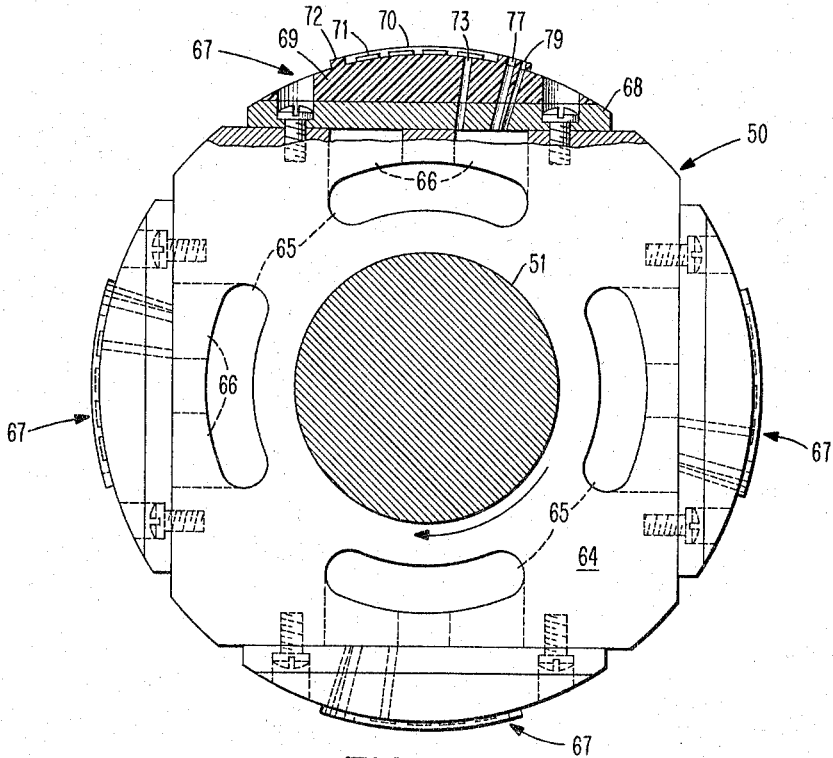
FIG. 8 is a sectional view taken on line 8—8 of FIG. 5 showing the distribution of vacuum within the film transfer drum.

Referring to FIG. 8, the film transfer drum 50 comprises a main four-sided core or hub 64 having four interior symmetrical ports 65 arranged as shown. The ports 65 communicate through identical ports in the side plate 58 to the ports 61 and 62 in the vacuum control plate 55 as the drum rotates. Each of the ports 65 is connected to the exterior of the main core by way of a pair of passageways or ports 66. Fastened to the sides of the main core are four segments 67 which make up the peripheral surface of the drum and which function to receive and hold the film pieces while they are being transported.

Figure 7:
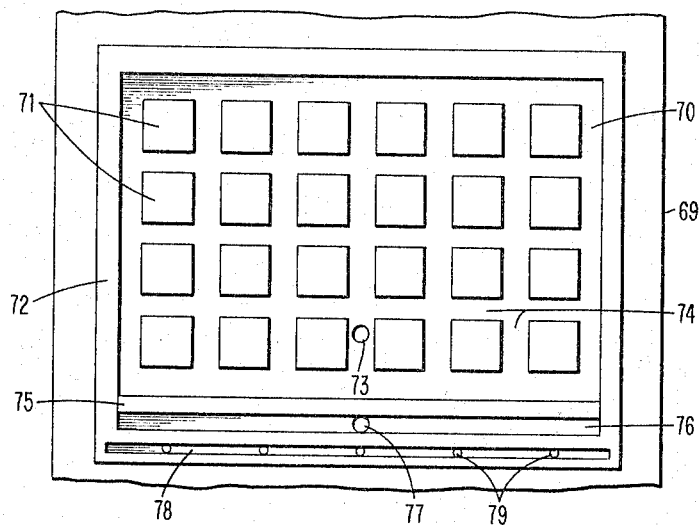
FIG. 7 is an enlarged plan view of one of the film retaining segments of the film transfer drum.

Each segment 67 consists of a metal base 68 to which is bonded a plastic or rubber member 69 having a convex surface on which is formed a waffle-like section 70 having substantially the dimension of the film piece which is to be gripped and held. As shown in FIG. 7, each waffle section 70 includes a plurality of raised square areas 71 disposed within a raised border 72. A vacuum port 73, which communicates with the passageway 66 in the drum core, is provided for the channels 74 formed by the areas 71 and a raised cross-strip 75. The channel 76 between the cross-strip and the border is also provided with a vacuum port 77 and a channel 78 is provided in the border which includes a plurality of vacuum ports 79. The ports 77 and 79 also communicate with passageway 66 in the drum core. Two passageways 66 are provided for each segment position to allow the segments to be mounted in either of two opposite directions, if desired.

In the embodiment shown, the drum is rotating in a clockwise direction with the segments disposed thereon so that the ports 79 are leading. As the film piece starts to feed onto the drum, the entire leading edge of the film is gripped by the line of ports 79 in channel 78 to accurately position the film piece for transfer onto the drum. In completing the transfer, the film is next gripped by the vacuum channel 76 and then progressively gripped against the surfaces of the raised square areas 71 due to the vacuum created in the channel areas 74.

A feature of the present novel transfer drum resides in the fact that the waffle construction of the segments results in a more accurate and effective transfer of the film onto the drum and a more positive retention of the film after it has been transferred. The reason for this is because the vacuum ports are not sealed off by the film piece as it transfers. The channels formed by the raised surfaces 71, 72 and 75 allow for a substantial and even distribution of vacuum to be maintained to control the film piece. As a result, the film piece is held much flatter and undesirable wrinkles are avoided.

Referring to FIG. 1, the film pieces are transported through an adhesive applying station which comprises a supply of adhesive 80, a gravure roll 81 and a doctor blade 82. The gravure sections 83 on the roll coat against the raised border 72 of each segment 67 on drum 50 to apply a border of adhesive around the perimeter of each film piece as it feeds by. As shown in FIG. 8, another important feature of the waffle segment is that the raised border 72 is slightly higher than the raised square areas 71 to enable the center or image portion of the film piece to be dished downward and thus remain free from any adhesive.

Figure 13:
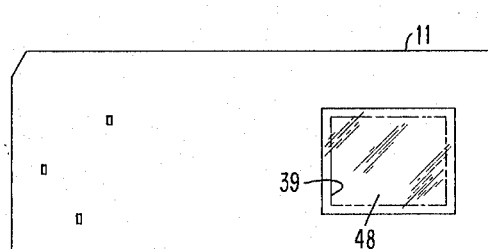

From the adhesive applying station, the film pieces are delivered to the card drum and transferred onto the shouldered aperture in each card. As each film piece arrives in position to be transferred to a card, its related interior vacuum port 65 (FIG. 8) will be in position to communicate with the ports 62 and 63 on the stationary control plate 55 (FIG. 6). As was mentioned, ports 62 and 63 communicate with the atmosphere thus enabling each film piece to be effectively transferred to its related card. The completed film record card is shown in FIG. 13. The film piece 48 is secured to the shoulder surrounding the aperture 39 and lies within the plane formed by the opposite surfaces of the card so that there is no protrusion of film which would hinder machine processing of the card.

The completed film record cards are transported between a card guide 84 and a card transfer roll 85 and then fed by continuously driven feed rolls 86 onto a suitable stacker and conveyer mechanism 87.

It will be understood that the various units of the machine may be made removable or otherwise disabled if it is desired to process partially completed cards. For example, the film applying station may be rendered ineffective so that only apertured cards are produced for those customers who wish to mount the film themselves, or the grinding and scoring units may be rendered ineffective so that cards which have already been apertured may be processed for the mounting of film. Also, the capacity of the machine may be easily doubled, for example, by simply adding another parallel row of stations around the central card drum so that cards may be processed in double stream fashion.

While the invention has been particularly shown and described with reference to a preferred embodiment thereof, it will be understood by those skilled in the art that various changes in form and details may be made therein without departing from the spirit and scope of the invention.

What is claimed is:

1. In a machine for automatically producing from a stack of blank record cards and a film roll record cards each having a shouldered aperture therein and a film piece secured over said shouldered aperture in one face of the card, the combination of:
 a central rotating card drum;
 mean for depositing successive blank record cards onto the surface of said drum;
 vacuum means associated with said drum for retaining successive record cards deposited thereon, said drum conveying said successive record cards past a plurality of mechanisms arranged in successive order around the periphery of said drum for performing operations simultaneously on separate cards;
 said mechanisms including first and second grinding mechanisms coacting with said drum for forming a rectangular shoulder depression in each card;
 a scoring and chip removal mechanism coacting with said drum for forming an apertured area within the rectangular shoulder depression of each card;
 a film applying mechanism for cutting said film roll into film pieces, applying an adhesive border to each film piece and securing a film piece over the aperture and to the rectangular shoulder depression in each card on said drum; and
 mechanism for removing and stacking film record cards from said drum.

2. In a machine for automatically producing from a stack of blank record cards and a film roll film record cards each having a shoulder aperture therein and a film piece secured over said shouldered aperture in one face of the card, the combination of:
 a central rotating card drum;
 a plurality of die inserts disposed around the periphery of said drum, each said insert having the configuration of a rectangular frame;
 means for depositing successive blank record cards onto the surface of said drum with a portion of each card overlying one of said die inserts;
 vacuum means associated with said drum for retaining successive record cards deposited thereon, said drum conveying said successive record cards past a plurality of mechanisms arranged in successive order around the periphery of said drum for performing operations simultaneously on separate cards;
 said mechanisms including first and second grinding mechanisms coacting with said die inserts for forming a rectangular shoulder depression in each card;
 a scoring and chip removal mechanism coacting with said die inserts for forming an apertured area within the rectangular shoulder depression of each card;
 a film applying mechanism for cutting said film roll into film pieces, applying an adhesive border to each film piece and securing a film piece over the aperture and to the rectangular shoulder depression in each card on said drum; and
 mechanism for removing and stacking film record cards from said drum.

3. A machine as defined in claim 1 wherein said first grinding mechanism comprises a grinding wheel rotating in one direction and said second grinding mechanism comprises a grinding wheel rotating in an opposite direction from that of said first wheel to form a shouldered depression which is free of burrs.

4. A machine as defined in claim 1 wherein said scoring and chip removal mechanism comprises a rotating roller having a plurality of scoring assemblies disposed around its periphery, each said assembly including independently mounted blades for scoring said area of each card and hook-shaped members for piercing said scored area and removing said from each card, said mechanism also including means for stripping the removed cardstock from said hook-shaped members.

5. A machine as defined in claim 1 wherein said film applying mechanism comprises a rotating cutter roll for severing said film roll into film pieces, a rotating film transfer drum for receiving successive film pieces from said cutter roll, vacuum means associated with said film drum for retaining successive film pieces deposited thereon for transfer to said apertured cards, a supply of adhesive, and a rotating gravure roller for applying an adhesive border to each film piece on said transfer drum.

6. A machine as defined in claim 2 wherein said vacuum means includes a plurality of vacuum channels arranged around the periphery of each of said die inserts for positively gripping each card in the area thereof which is operated on by said mechanisms.

7. An apparatus on a record card forming machine for applying film pieces from a film roll to apertured record cards continuously moving along a path of travel on conveying means of the record card forming machine, comprising:

rotating rolls for metering a strip of film from said film roll;

a rotating cutter roll coacting with one of said metering rolls for severing said film strip into individual film pieces;

a rotating film transfer vacuum drum having a plurality of film receiving segments disposed around its peripheral surface;

means for supplying vacuum to each of said film receiving segments;

a rotating notched roll for transferring each severed film piece to one of said segments whereby successive film pieces are gripped and conveyed by said transfer drum;

a supply of adhesive;

a rotating gravure roller coacting with said segments to apply an adhesive border to each film piece; and control means for disabling the vacuum to each segment during transfer of its associated film piece to an apertured record card.

8. An apparatus as defined in claim 7 wherein each said film receiving segment includes a waffle-like surface section which forms a network of vacuum channels to provide for a substantial and even distribution of vacuum to be maintained to control said film pieces.

9. An apparatus as defined in claim 7 wherein said film transfer drum includes a plurality of interior vacuum ports communicating with each of said film receiving segments and said control means includes a stationary plate having an elongated vacuum port and a short port to the atmosphere, said latter ports communicating successively with said interior ports as said transfer drum rotates.

10. In a machine of the class described a rotating film transfer drum for conveying successive film pieces fed thereto to which comprises:

a plurality of film receiving segments disposed about the peripheral surface of said drum;

each said segment including a waffle-like surface section corresponding in size to the size of a film piece to be positioned thereon and having a plurality of raised areas disposed within a raised border;

said areas forming a network of cross-channels therebetween; and a vacuum port communicating with said network of cross-channels, said cross-channels enabling a substantial and even distribution of vacuum to be maintained whereby a film piece positioned thereon will be held more positively and smoothly.

11. A machine as defined in claim 10 wherein said raised border is slightly higher than said raised areas so that the center portion of each film piece thereon will be dished downward.

12. A machine as defined in claim 10 including an elongated channel formed in one leg of said raised border, and a row of vacuum ports communicating with said elongated channel to provide a channel of vacuum for gripping the leading edge of a film piece presented thereto.

13. An apparatus as defined in claim 7 wherein each said film receiving segment includes a waffle-like surface section corresponding in size to the size of a film piece to be positioned thereon and having a plurality of raised areas disposed within a raised border which forms a network of vacuum channels to provide for a substantial and even distribution of vacuum to be maintained to control said film pieces;

said raised border being slightly higher than said raised areas whereby the center portion of each film piece thereon will be dished downward to remain clear of said gravure roller and adhesive.

No references cited.

EARL M. BERGERT, *Primary Examiner.*

D. J. DRUMMOND, *Assistant Examiner.*